US009053435B2

(12) United States Patent
Krukow et al.

(10) Patent No.: US 9,053,435 B2
(45) Date of Patent: Jun. 9, 2015

(54) GENERATING APPLICATION MODELS BASED ON DISCOVERY BASED MACHINE LEARNING

(71) Applicant: Xamarin Inc., San Francisco, CA (US)

(72) Inventors: Karl Krukow, Hinnerup (DK); Jonas Maturana Larsen, Tilst (DK); David Siegel, San Francisco, CA (US); Nathaniel Dourif Friedman, San Francisco, CA (US); Jason Adam Smith, Walnut Creek, CA (US); Vinicius Scopel Depizzol, San Francisco, CA (US)

(73) Assignee: Xamarin Inc., San Francisco, CA (US)

( * ) Notice: Subject to any disclaimer, the term of this patent is extended or adjusted under 35 U.S.C. 154(b) by 0 days.

(21) Appl. No.: 14/029,670

(22) Filed: Sep. 17, 2013

(65) Prior Publication Data

US 2015/0081598 A1    Mar. 19, 2015

(51) Int. Cl.
*G06N 99/00* (2010.01)
*G06F 11/36* (2006.01)
*G06N 5/04* (2006.01)

(52) U.S. Cl.
CPC .......... *G06N 99/005* (2013.01); *G06F 11/3664* (2013.01); *G06N 5/04* (2013.01)

(58) Field of Classification Search
USPC ........................................... 706/12; 717/125
See application file for complete search history.

(56) References Cited

U.S. PATENT DOCUMENTS

| 5,790,117 | A  | * | 8/1998 | Halviatti et al. ............... 715/744 |
| 6,662,217 | B1 |   | 12/2003 | Godfrey et al. |
| 7,415,635 | B1 |   | 8/2008 | Annangi |
| 8,171,127 | B2 |   | 5/2012 | Frost et al. |
| 8,171,406 | B1 |   | 5/2012 | Newstadt et al. |
| 8,448,070 | B2 | * | 5/2013 | Dailey .......................... 715/738 |
| 2006/0052080 | A1 | * | 3/2006 | Vitikainen et al. ............ 455/403 |
| 2008/0139195 | A1 | * | 6/2008 | Marsyla et al. ............... 455/423 |
| 2008/0148235 | A1 | * | 6/2008 | Foresti et al. ................. 717/123 |
| 2011/0041121 | A1 |   | 2/2011 | Schalk |
| 2011/0185231 | A1 |   | 7/2011 | Balestrieri et al. |

(Continued)

OTHER PUBLICATIONS

Official Communication received in U.S. Appl. No. 14/029,631 mailed Jan. 13, 2014.

(Continued)

*Primary Examiner* — Kakali Chaki
*Assistant Examiner* — Mai T Tran
(74) *Attorney, Agent, or Firm* — John W. Branch; Lowe Graham Jones PLLC

(57) ABSTRACT

Embodiments are directed towards generating application models based on discovery based machine learning. A mobile application may be uploaded to a computer that may be part of a testing platform. A reference mobile computer may be selected and the mobile application maybe installed onto the reference mobile computer. Also, the testing platform may generate an initial application model based on the mobile application. The current active window of the mobile application may be determined and the application model may be updated accordingly. Screenshots may be generated that correspond to each current active window of the mobile application. Also, each user-interface control in the active window may be activated. The results of activating each control may be observed and added to the model. If the activation causes navigation, another active window may be determined. The application model may be used for testing other mobile computers.

30 Claims, 10 Drawing Sheets

(56) References Cited

U.S. PATENT DOCUMENTS

| | | |
|---|---|---|
| 2011/0210907 A1* | 9/2011 | Martin-Cocher et al. ..... 345/1.3 |
| 2011/0251988 A1* | 10/2011 | Pronk et al. .................... 706/46 |
| 2012/0035904 A1 | 2/2012 | Seckendorf et al. |
| 2012/0198279 A1* | 8/2012 | Schroeder ........................ 714/32 |
| 2012/0253745 A1* | 10/2012 | Dhanapal et al. ............. 702/186 |
| 2012/0299859 A1* | 11/2012 | Kinoshita .................... 345/173 |
| 2013/0080502 A1 | 3/2013 | McColl et al. |
| 2013/0081001 A1 | 3/2013 | McColl et al. |
| 2013/0152047 A1 | 6/2013 | Moorthi et al. |
| 2013/0179144 A1 | 7/2013 | Lu et al. |
| 2013/0179865 A1 | 7/2013 | Neumeyer et al. |
| 2013/0196600 A1 | 8/2013 | Capers et al. |
| 2013/0318397 A1 | 11/2013 | Jamison |
| 2013/0326465 A1 | 12/2013 | Jain et al. |

OTHER PUBLICATIONS

Official Communication received in U.S. Appl. No. 14/029,663 mailed Jan. 30, 2014.

* cited by examiner

GENERATING APPLICATION MODELS BASED ON DISCOVERY BASED MACHINE LEARNING

TECHNICAL FIELD

This invention relates generally to mobile application development, and more particularly, but not exclusively, to deploying mobile application code to a testing platform in a cloud-based environment.

BACKGROUND

A highly competitive mobile application marketplace and the consumerization of information technology have put tremendous pressure on mobile application developers to deliver high quality mobile user experiences for both consumers and employees. In this competitive environment, a small defect or failure may lead to permanent application abandonment or poor reviews. Moreover, device fragmentation, with hundreds of mobile computers on the market for a variety of different mobile operating systems, multiplies quality assurance efforts resulting in a time-consuming and costly development process. The difficulties associated with providing sufficient quality assurance may be further aggravated by faster release cycles for mobile applications, which may necessitate more stringent and efficient regression testing. Furthermore, since user-interfaces for mobile applications may also change often, traditional user-interface testing tools that often may require significant investment to configure and set up may rely on fragile methods for defining correct user-interface behavior. Accordingly, failure to keep these user-interface testing tools in sync with the faster-release cycles for mobile applications may often lead to broken or ineffective test cases. In addition, many traditional user-interface test tools do not provide cross-platform support and may be difficult to integrate into mobile application developer tools and workflow. Thus, it is with respect to these and other considerations that these innovations are made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the present innovations, reference will be made to the following Description of the Various Embodiments, which is to be read in association with the accompanying drawings, wherein.

DESCRIPTION OF THE VARIOUS EMBODIMENTS

Figure 1:
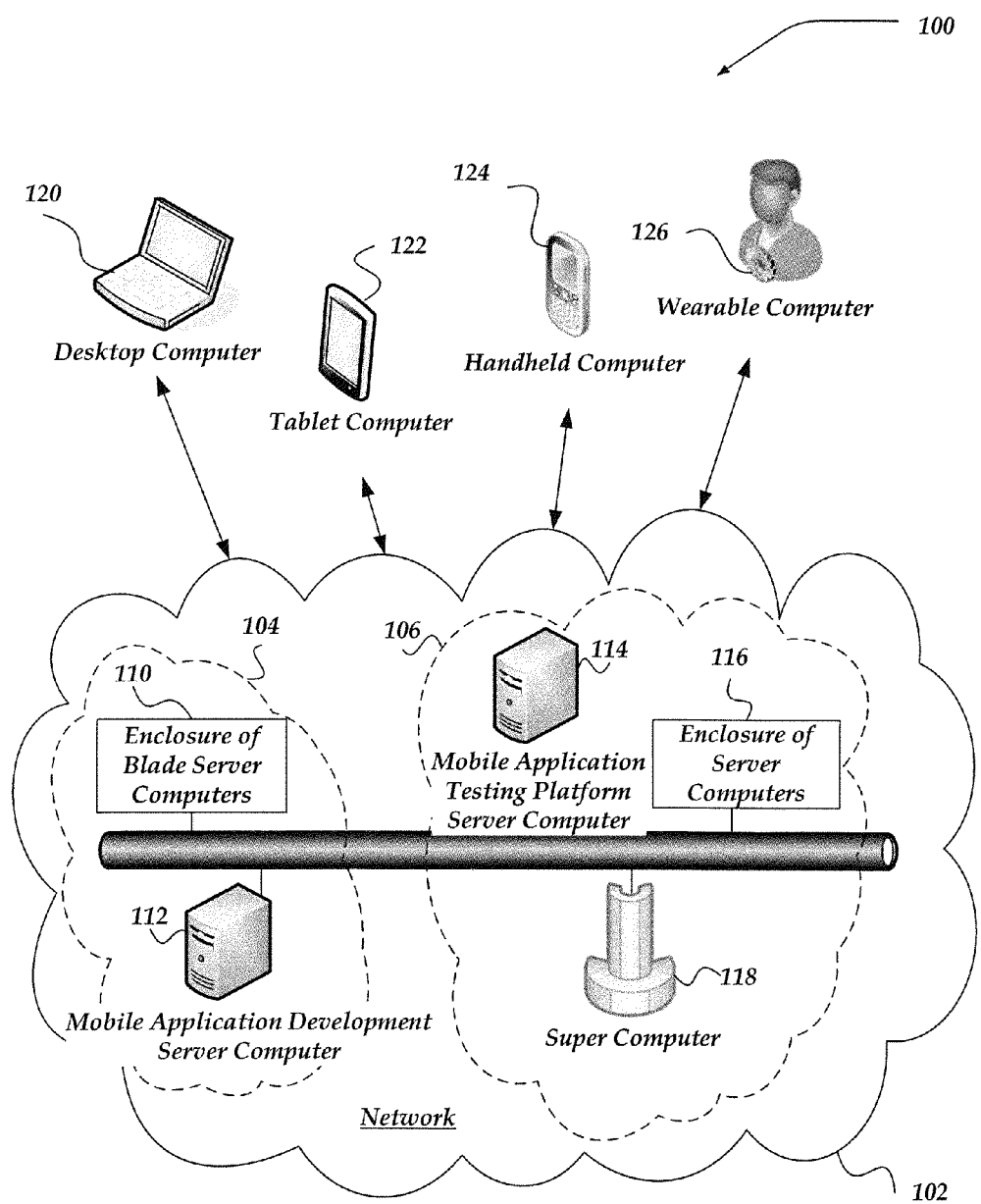
FIG. 1 illustrates a system environment in which various embodiments may be implemented.

The present innovations now will be described more fully hereinafter with reference to the accompanying drawings, which form a part hereof, and which show, by way of illustration, specific embodiments by which the innovations may be practiced. These innovations may, however, be embodied in many different forms and should not be construed as limited to the embodiments set forth herein; rather, these embodiments are provided so that this disclosure will be thorough and complete, and will fully convey the various embodiments to at least those skilled in the art. Among other things, the present innovations may be embodied as methods, computers, or devices. Accordingly, the embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "mobile application" as used herein refers to a computing/software application designed to operate on a mobile computer. While the term mobile application is used throughout this description, one of ordinary skill in art the will appreciate that other type of applications may benefit from these innovations and are well within the scope and spirit of the disclosed innovations, including, but not limited to, web applications, web pages, "desktop" applications, or the like.

The term "mobile application developer" as used herein refers to users that design and develop mobile applications. Mobile application developers may create and deploy mobile application to the mobile application testing platform.

The term "mobile computer" as used herein refers networked computers and may include tablet computers, handheld computers, wearable computers, desktop computers, or the like. Mobile computers may also include notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding computers, or the like.

The term "test script" as used herein refers to a script (e.g. program) that may be written in various computer software languages, such as, Ruby, C# (C-sharp), Objective-C, Java, JavaScript, C, C++, or the like. Generally, test scripts may be written in any known and/or custom computer software language. In at least one of the various embodiments, test scripts may be arranged to include one or more test steps within a test script. Further, in at least one of the various embodiments, test scripts may include additional information used for configuring tests, such as, scheduling information (e.g., when to run the test, how often to run the test, or the like), reporting configuration (e.g., notification rules, report formatting, or the like), mobile computer criteria, or the like.

The term "test step" as used herein refers to a test step may be a portion of a script arranged to perform one or more actions on the mobile computers currently being tested. In at least one of the various embodiments, one or more test steps may be grouped and/or organized into a test and/or included in a test script.

The term "mobile computer criteria" as used herein refers to information provided to the mobile application testing platform for use in identifying and/or filtering mobile computers. Mobile computer criteria may be used in various contexts to filter computers for testing from a larger collection. (E.g., Such as those computers that should be included in a particular test run.) Mobile computer criteria information may comprise, screen size, screen resolution, screen pixel density, operating system, operating system version, input method (e.g., keypad, touch, voice, or the like), processor speed, processor type, memory capacity, manufacturer, market share, installed other applications, GPS availability, past test performance, camera characteristics, or the like.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards generating application models based on discovery based machine learning. In at least one of the various embodiments, a mobile application may be uploaded to a computer that may be part of a mobile application testing platform over a network. In at least one of the various embodiments, a reference mobile computer may be selected based on at least one characteristic of the mobile application. In at least one of the various embodiments, the computer may install the mobile application onto the reference mobile computer over a network. Also, in at least one of the various embodiments, the mobile application testing platform may generate an initial version of an application model based on the mobile application. In at least one of the various embodiments, an active window of the mobile application may be determined and the application model may be updated to include the active window.

In at least one of the various embodiments, at least one screenshot may be generated on the reference mobile computer such that the screenshot corresponds to the active window of the mobile application. In at least one of the various embodiments, each of the user-interface (UI) controls included in the active window may be activated (e.g., pressed, clicked, filled, selected, or the like).

In at least one of the various embodiments, another screenshot may be generated on the reference mobile computer such that each screenshot corresponds to the activation of each UI control. In at least one of the various embodiments, a test script may be generated based on the application model. In at least one of the various embodiments, at least one portion of the test script may be generated such that there may be a portion corresponding to each active window of the mobile application that may have been visited on the reference mobile computer.

In at least one of the various embodiments, the active windows of the mobile application may be classified based on one or more heuristic tests associated with one or more UI profiles, wherein the classification and UI profile may determine how the UI controls in the active window are activated. In at least one of the various embodiments, common UI profiles may include, mailing address, telephone number, credit card entry (e.g., card type, credit card number, cardholder name, expiration date, or the like), date/time entry, appointment setting, email address, login page, or the like.

In at least one of the various embodiments, activating the at least one UI control may further include determining another active window if the activation of the UI control results in a navigation away from the active window. In at least one of the various embodiments, if the activation of the UI control results in navigation to another window in the mobile application, that window may become the action window. Also, in at least one of the various embodiments, activating the UI controls may be used to generate one or more portions of the application model such that each portion added to the application model corresponds to the activated UI control.

In at least one of the various embodiments, the computer may be arranged to install the test script on one or more other mobile computers, wherein the results of running the test script may be stored for later analysis and/or comparison with the application model. In at least one of the various embodiments, an interactive display of the application model and the test script may be generated such that if the test script is stepped through by a user, the portion of the application model that corresponds to the portion of the test script being stepped through may be highlighted or otherwise emphasized. In at least one of the various embodiments, the reference mobile computer may be determined based on at least one of a screen size, screen resolution, operating system, input method, processor speed, memory capacity, manufacturer, or market share.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computer. As shown, the networked computers may include mobile application development server computer 112, mobile application testing platform server computer 114, enclosure of blade server computers 110, enclosure of server computers 116, super computer 118, and the like. Although not shown, one or more mobile computers may be included in cloud network 102 in one or more arrangements to provide one or more network services to a user. Also, these arrangements of networked computers may or may not be mutually exclusive of each other.

In at least one of the various embodiments, mobile application development server computer 112 may include module, processes, components, services, or the like, used by mobile application developers for developing mobile applications, and the like. Also, in at least one of the various embodiments, mobile application testing platform server computer 114 may include processes, modules, services, components, or the like, for receiving mobile applications for testing, managing testing of mobile applications, generating reports based testing results, as well as requests and other communications to and from client computers that may be running various client applications. Mobile application testing platform server computer 114 may perform actions further described in conjunction with FIGS. 5-9.

Also, in at least one of the various embodiments, enclosure of blade server computers 110, enclosure of enclosure of server computers 116, super computer 118 may include computers that perform the actions of mobile application testing platform server computer 114.

Additionally, the user may employ a plurality of virtually any type of wired or wireless networked computers to communicate with cloud network 102 and access at least one of the network services enabled by one or more of arrangements 104 and 106. These networked computers may include tablet computer 122, handheld computer 124, wearable computer 126, desktop computer 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding computers, and the like.

One embodiment of a client computer is described in more detail below in conjunction with FIG. 3. Generally, client computers may include virtually any substantially portable networked computer capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computers could be remotely connected to networks via a modem and a temporary communication link. In essence, network 102 may include virtually any communication technology by which information may travel between computers. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network computers such as terminals, gateways, routers, switches, firewalls, load balancers, and the like, which are coupled to wired and/or wireless communication links. These autonomous computers may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), (5G) generation wireless access technologies, and the like, for mobile computers. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide Interoperability for Microwave Access (WiMax), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile computer to wirelessly access a network service through a combination of several radio network access technologies such as GSM, EDGE, SMS, HSDPA, LTE and the like.

Enclosure of Blade Server Computers

Figure 2A:
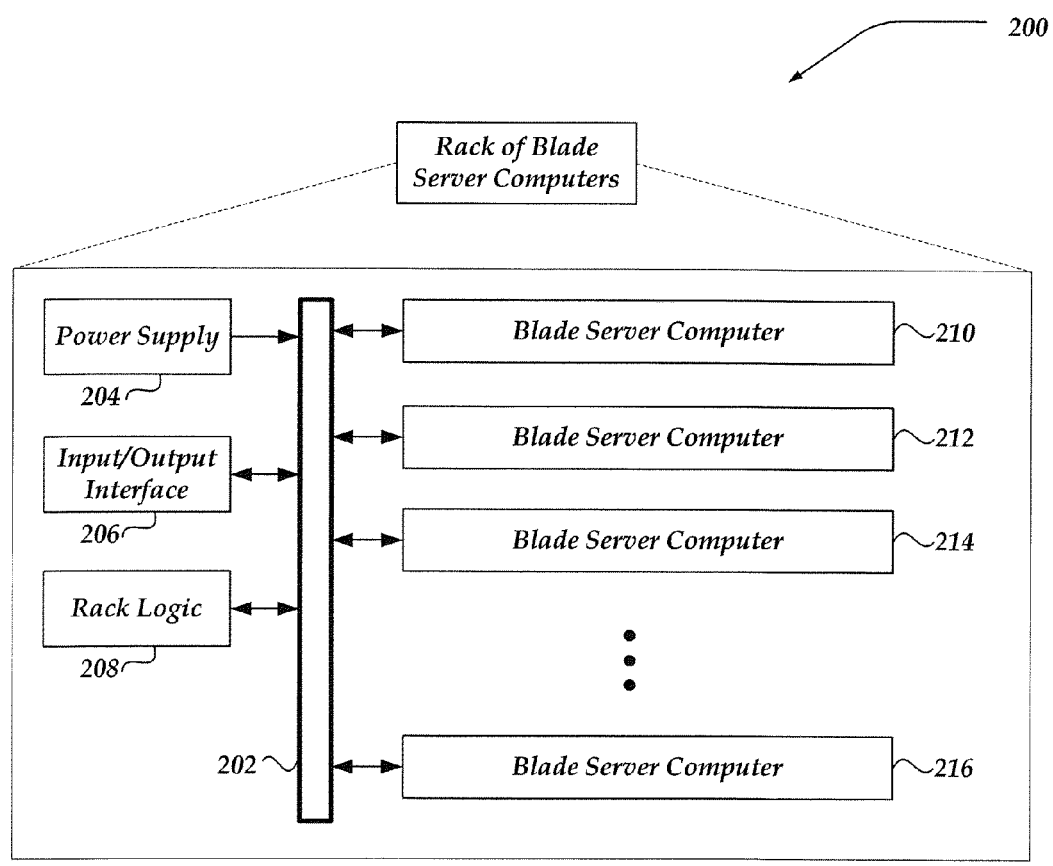
FIG. 2A shows a schematic drawing of a rack of blade server computers.

FIG. 2A shows one embodiment of an enclosure of blade server computers 200, which are also illustrated in FIG. 1. Enclosure of blade server computers 200 may include many more or fewer components than those shown in FIG. 2A. However, the components shown are sufficient to disclose an illustrative embodiment. Generally, a blade server computer is a stripped down computer with a modular design optimized to minimize the use of physical space and energy. A blade enclosure can include several blade server computers and provide each with power, cooling, network interfaces, input/output interfaces, and resource management. Although not shown, an enclosure of server computers typically includes several computers that may have at least one network connection and a power cord connection. Each server computer often includes redundant components for power and interfaces.

As shown in the figure, enclosure 200 contains power supply 204, and input/output interface 206, rack logic 208, several blade server computers 210, 212, 214, and 216, and backplane 202. Power supply 204 provides power to each component and blade server computer within the enclosure. The input/output interface 206 provides internal and external communication for components and blade server computers within the enclosure. Backplane 208 can enable passive and active communication of power, logic, input signals, and output signals for each blade server computer.

Illustrative Blade Server Computer

Figure 2B:
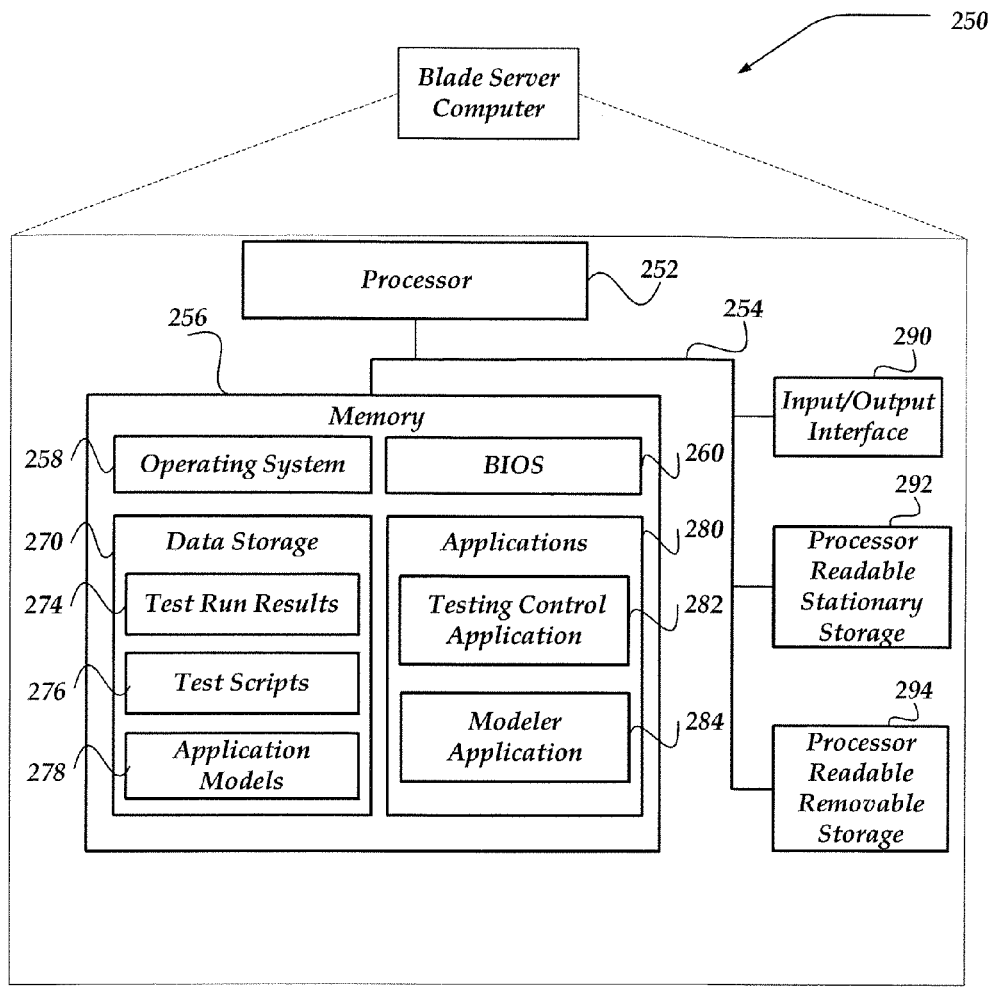
FIG. 2B illustrates a schematic embodiment of a blade server computer that may be included in a rack of blade server computers such as that shown in FIG. 2A.

FIG. 2B illustrates an illustrative embodiment of blade server computer 250, which may include many more or fewer components than those shown. As shown in FIG. 2A, a plurality of blade server computers may be included in one enclosure that shares resources provided by the enclosure to reduce size, power, and cost.

Blade server computer 250 includes processor 252 which communicates with memory 256 via bus 254. Blade server computer 250 also includes input/output interface 290, processor-readable stationary storage device 292, and processor-readable removable storage device 294. Input/output interface 290 can enable blade server computer 250 to communicate with other blade server computers, mobile computers, network computers, and the like. Interface 290 may provide wireless and/or wired communication links for blade server computer. Processor-readable stationary storage device 292 may include one or more devices such as an electromagnetic storage device (hard disk), solid state hard disk (SSD), hybrid of both an SSD and a hard disk, and the like. In some configurations, a blade server computer may include multiple storage devices. Also, processor-readable removable storage device 294 enables processor 252 to read non-transitory storage media for storing and accessing processor-readable instructions, code, modules, data structures, and other forms of data. The non-transitory storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server computer 250. In various embodiments, a general-purpose operating system may be employed such as a version of UNIX, LINUX™, a specialized server operating system such as Microsoft's Windows Server™, or the like.

Memory 256 further includes one or more data storage 270, which can be utilized by blade server computer 250 to store, among other things, applications 280 and/or other data. Data store 270 may include program code, instructions, data, algorithms, and the like, for use by processor 252 to execute and perform actions such as those described in conjunction with FIGS. 5-23. In one embodiment, at least some of datastore 270 might also be stored on another component of blade server computer 250, including, but not limited to, processor-readable removable storage device 294, processor-readable stationary storage device 292, or any other non-transitory processor-readable storage device (not shown). Data storage 270 may include, for example, test run results 274, test scripts 276, application models 278, or the like. Test run results 274 may contain various data generated from testing mobile applications, include various measured metrics for tested applications, log files, event files, stack traces, or the like. Likewise, test scripts 276 may contain scripts and/or programs that may be employed to test mobile applications, as well as, other supporting data, arranged in lists, databases, configuration files, or the like. Also, application models 278 may include one or more partial or complete application models that generated from one or more applications.

Applications 280 may include processor executable instructions which, when executed by blade server computer 250, transmit, receive, and/or otherwise process messages, audio, video, and enable communication with other networked computers. Examples of application programs include database servers, file servers, calendars, transcoders, and so forth. Applications 280 may include, for example, testing control application 282, and/or modeler application 284, which may be enabled to perform actions further described below in conjunction with FIGS. 5-9.

Human interface components (not pictured), may be remotely associated with blade server computer 250, which can enable remote input to and/or output from blade server computer 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Furthermore, in at least one of the various embodiments, testing control application 282 and/or modeler application 284 may be operative in a cloud-based computing environment. In at least one of the various embodiments, this application, and others, that comprise the mobile application testing platform may be executing within virtual machines and/or virtual servers that may be managed in a cloud-based based computing environment. In at least one of the various embodiments, in this context the applications may flow from one physical blade server computer and/or network computer within the cloud-based environment to another depending on performance and scaling considerations automatically managed by the cloud computing environment. Likewise, in at least one of the various embodiments, virtual machines and/or virtual servers dedicated to running testing control application 282 and/or modeler application 284 may be provisioned and de-commissioned automatically.

Also, in at least one of the various embodiments, test run results 274, test scripts 276, application models 278, or the like, may be located on virtual servers running in a cloud-based computing environment rather than being tied to one or more specific physical blade server computers.

Illustrative Mobile Computer

Figure 3:
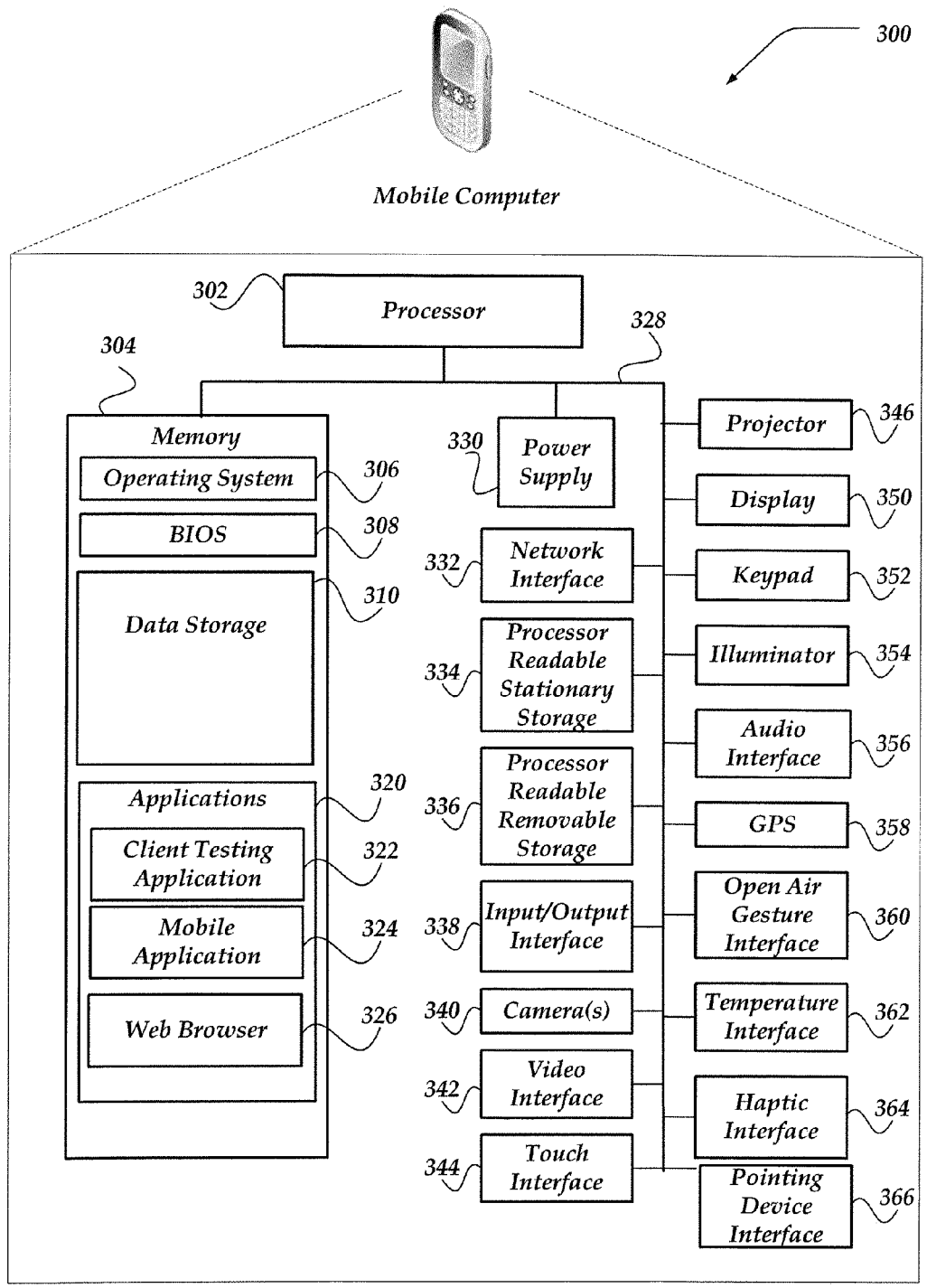
FIG. 3 shows a schematic embodiment of a mobile computer.

FIG. 3 shows one embodiment of mobile computer 300 that may include many more or less components than those shown. Mobile computer 300 may represent, for example, at least one embodiment of mobile computers shown in FIG. 1.

Mobile computer 300 may include processor 302 in communication with memory 304 via bus 328. Mobile computer 300 may also include power supply 330, network interface 332, audio interface 356, display 350, keypad 352, illuminator 354, video interface 342, input/output interface 338, haptic interface 364, global positioning systems (GPS) receiver 358, open air gesture interface 360, temperature interface 362, camera(s) 340, projector 346, pointing device interface 366, processor-readable stationary storage device 334, and processor-readable removable storage device 336. Mobile computer 300 may optionally communicate with a base station (not shown), or directly with another computer. And in one embodiment, although not shown, a gyroscope may be employed within mobile computer 300 to measuring and/or maintaining an orientation of mobile computer 300.

Power supply 330 may provide power to mobile computer 300. A rechargeable or non-rechargeable battery may be used to provide power. The power may also be provided by an external power source, such as an AC adapter or a powered docking cradle that supplements and/or recharges the battery.

Network interface 332 includes circuitry for coupling mobile computer 300 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 332 is sometimes known as a transceiver, transceiving device, or network interface card (NIC).

Audio interface 356 may be arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of mobile computer 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computer. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures.

Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images.

Illuminator 354 may provide a status indication and/or provide light. Illuminator 354 may remain active for specific periods of time or in response to events. For example, when illuminator 354 is active, it may backlight the buttons on keypad 352 and stay on while the mobile computer is powered. Also, illuminator 354 may backlight these buttons in various patterns when particular actions are performed, such as dialing another mobile computer. Illuminator 354 may also cause light sources positioned within a transparent or translucent case of the mobile computer to illuminate in response to actions.

Mobile computer 300 may also comprise input/output interface 338 for communicating with external peripheral devices or other computers such as other mobile computers and network computers. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like.

Haptic interface 364 may be arranged to provide tactile feedback to a user of the mobile computer. For example, the haptic interface 364 may be employed to vibrate mobile computer 300 in a particular way when another user of a computer is calling. Temperature interface 362 may be used to provide a temperature measurement input and/or a temperature changing output to a user of mobile computer 300. Open air gesture interface 360 may sense physical gestures of a user of mobile computer 300, for example, by using single or stereo video cameras, radar, a gyroscopic sensor inside a computer held or worn by the user, or the like. Camera 340 may be used to track physical eye movements of a user of mobile computer 300.

GPS transceiver 358 can determine the physical coordinates of mobile computer 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile computer 300 on the surface of the Earth. It is understood that under different conditions, GPS transceiver 358 can determine a physical location for mobile computer 300. In at least one embodiment, however, mobile computer 300 may, through other components, provide other information that may be employed to determine a physical location of the mobile computer, including for example, a Media Access Control (MAC) address, IP address, and the like.

Human interface components can be peripheral devices that are physically separate from mobile computer 300, allowing for remote input and/or output to mobile computer 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile computer with such peripheral human interface components is a wearable computer, which might include a remote pico projector along with one or more cameras that remotely communicate with a separately located mobile computer to sense a user's gestures toward portions of an image projected by the pico projector onto a reflected surface such as a wall or the user's hand.

A mobile computer may include a browser application that is configured to receive and to send web pages, web-based messages, graphics, text, multimedia, and the like. The mobile computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include RAM, ROM, and/or other types of memory. Memory 304 illustrates an example of computer-readable storage media (devices) for storage of information such as computer-readable instructions, data structures, program modules or other data. Memory 304 may store BIOS 308 for controlling low-level operation of mobile computer 300. The memory may also store operating system 306 for controlling the operation of mobile computer 300. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 304 may further include one or more data storage 310, which can be utilized by mobile computer 300 to store, among other things, applications 320 and/or other data. For example, data storage 310 may also be employed to store information that describes various capabilities of mobile computer 300. The information may then be provided to another device or computer based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of mobile computer 300, including, but not limited to, non-transitory processor-readable removable storage device 336, processor-readable stationary storage device 334, or even external to the mobile computer.

Applications 320 may include computer executable instructions which, when executed by mobile computer 300, transmit, receive, and/or otherwise process instructions and data. Applications 320 may include, for example, client test application 322. In at least one of the various embodiments, client test application 322 may be used to exchange communications to and from mobile application testing platform server computer 114, including, but not limited to, queries, searches, API calls, or the like. Mobile application 324 may provide various application services for users. Client test application 322 may be employed to remote control mobile application 324 based on test scripts that may be provided by mobile application testing platform server computer 114.

Other examples of application programs include calendars, search programs, email client applications, IM applications, SMS applications, Voice Over Internet Protocol (VoIP) applications, contact managers, task managers, transcoders, database programs, word processing programs, security applications, spreadsheet programs, games, search programs, and so forth.

Illustrative Network Computer

Figure 4:
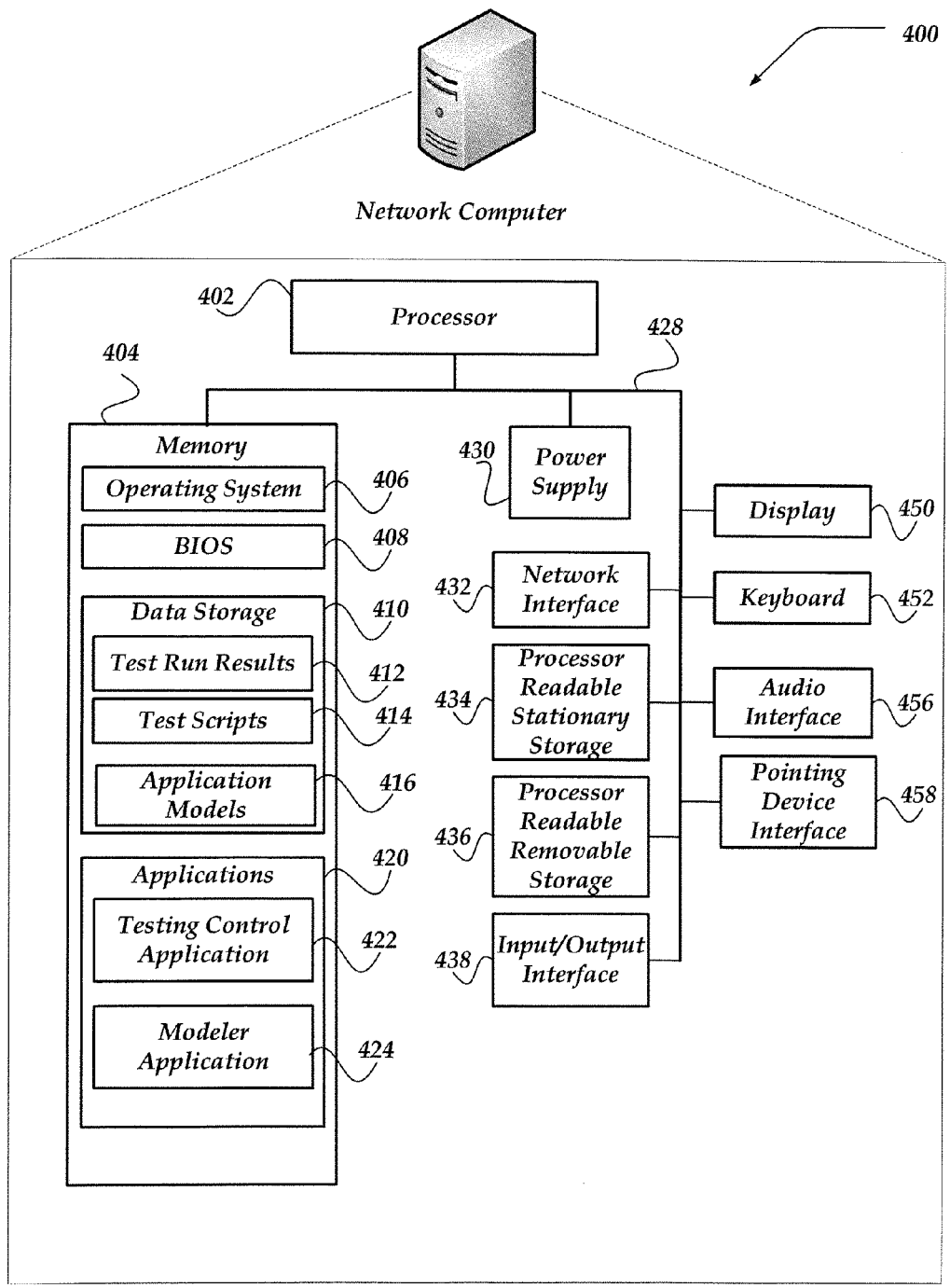
FIG. 4 illustrates a schematic embodiment of a network computer.

FIG. 4 shows one embodiment of network computer 400 that may be included in a system implementing the invention. Network computer 400 may include many more or less components than those shown in FIG. 4. However, the components shown are sufficient to disclose an illustrative embodiment for practicing these innovations. Network computer 400 may represent, for example, one embodiment of at least one of network computer 112, 114, or 120 of FIG. 1.

As shown in the figure, network computer 400 includes a processor 402 in communication with a memory 404 via a bus 428. Network computer 400 also includes a power supply 430, network interface 432, audio interface 456, display 450, keyboard 452, input/output interface 438, processor-readable stationary storage device 434, and processor-readable removable storage device 436. Power supply 430 provides power to network computer 400.

Network interface 432 includes circuitry for coupling network computer 400 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 432 is sometimes known as a transceiver, transceiving device, or network interface card (NIC). Network computer 400 may optionally communicate with a base station (not shown), or directly with another computer.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network computer 400, for example, using voice recognition.

Display 450 may be a liquid crystal display (LCD), gas plasma, electronic ink, light emitting diode (LED), Organic LED (OLED) or any other type of light reflective or light transmissive display that can be used with a computer. Display 450 may be a handheld projector or pico projector capable of projecting an image on a wall or other object.

Network computer 400 may also comprise input/output interface 438 for communicating with external devices or computers not shown in FIG. 4. Input/output interface 438 can utilize one or more wired or wireless communication technologies, such as USB™, Firewire™, WiFi, WiMax, Thunderbolt™, Infrared, Bluetooth™, Zigbee™, serial port, parallel port, and the like.

Human interface components can be physically separate from network computer 400, allowing for remote input and/or output to network computer 400. For example, information routed as described here through human interface components such as display 450 or keyboard 452 can instead be routed through the network interface 432 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 458 to receive user input.

Memory 404 may include Random Access Memory (RAM), Read-Only Memory (ROM), and/or other types of memory. Memory 404 illustrates an example of computer-readable storage media (devices) for storage of information such as computer-readable instructions, data structures, program modules or other data. Memory 404 stores a basic input/output system (BIOS) 408 for controlling low-level operation of network computer 400. The memory also stores an operating system 406 for controlling the operation of network computer 400. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs.

Memory 404 may further include one or more data storage 410, which can be utilized by network computer 400 to store, among other things, applications 420 and/or other data. For example, data storage 410 may also be employed to store information that describes various capabilities of network computer 400. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 410 may further include program code, data, algorithms, and the like, for use by a processor, such as processor 402 to execute and perform actions such as those actions described in conjunction with FIGS. 5-9. In one embodiment, at least some of data storage 410 might also be stored on another component of network computer 400, including, but not limited to, non-transitory media inside processor-readable removable storage device 436, processor-readable stationary storage device 434, or any other computer-readable storage device within network computer 400, or even external to network computer 400. Data storage 410 may include, for example, test run results 412, test scripts 414, application models 416, or the like. Test run results 412 may contain various data generated from testing mobile applications, include various measured metrics for tested applications, log files, event files, stack traces, or the like. Likewise, test scripts 414 may contain scripts and/or programs that may be employed to test mobile applications, as well as, other supporting data, arranged in lists, databases, configuration files, or the like. Also, application models 416 may include one or more partial or complete application models that generated from one or more applications.

Applications 420 may include computer executable instructions which, when executed by network computer 400, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VoIP) applications, contact managers, task managers, transcoders, database programs, word processing programs, security applications, spreadsheet programs, games, search programs, and so forth. Applications 420 may include testing control application 422 which may be enabled to perform actions further described below in conjunction with FIGS. 5-9. In at least one of the various embodiments, testing control application 422 may be implemented as modules and/or components of the same application. Further, in at least one of the various embodiments, testing control application 422 may be implemented as operating system extensions, modules, plugins, or the like.

Furthermore, in at least one of the various embodiments, testing control application 422 and/or modeler application 424 may be operative in a cloud-based computing environment. In at least one of the various embodiments, these applications, and others, that comprise the mobile development platform may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to running testing control application 422 and/or modeler application 424 may be provisioned and de-commissioned automatically.

Also, in at least one of the various embodiments, test run results 412, test scripts 414, application models 416, or the like, may located in virtual servers running in a cloud-based computing environment rather than being tied to one or more specific physical blade server computers or network computers.

Illustrative Architecture

In at least one of the various embodiments, a mobile application testing platform may be a system that enables mobile application developers to upload their mobile applications over a network to a mobile application testing platform for testing the quality and performance of the mobile application.

Figure 5:
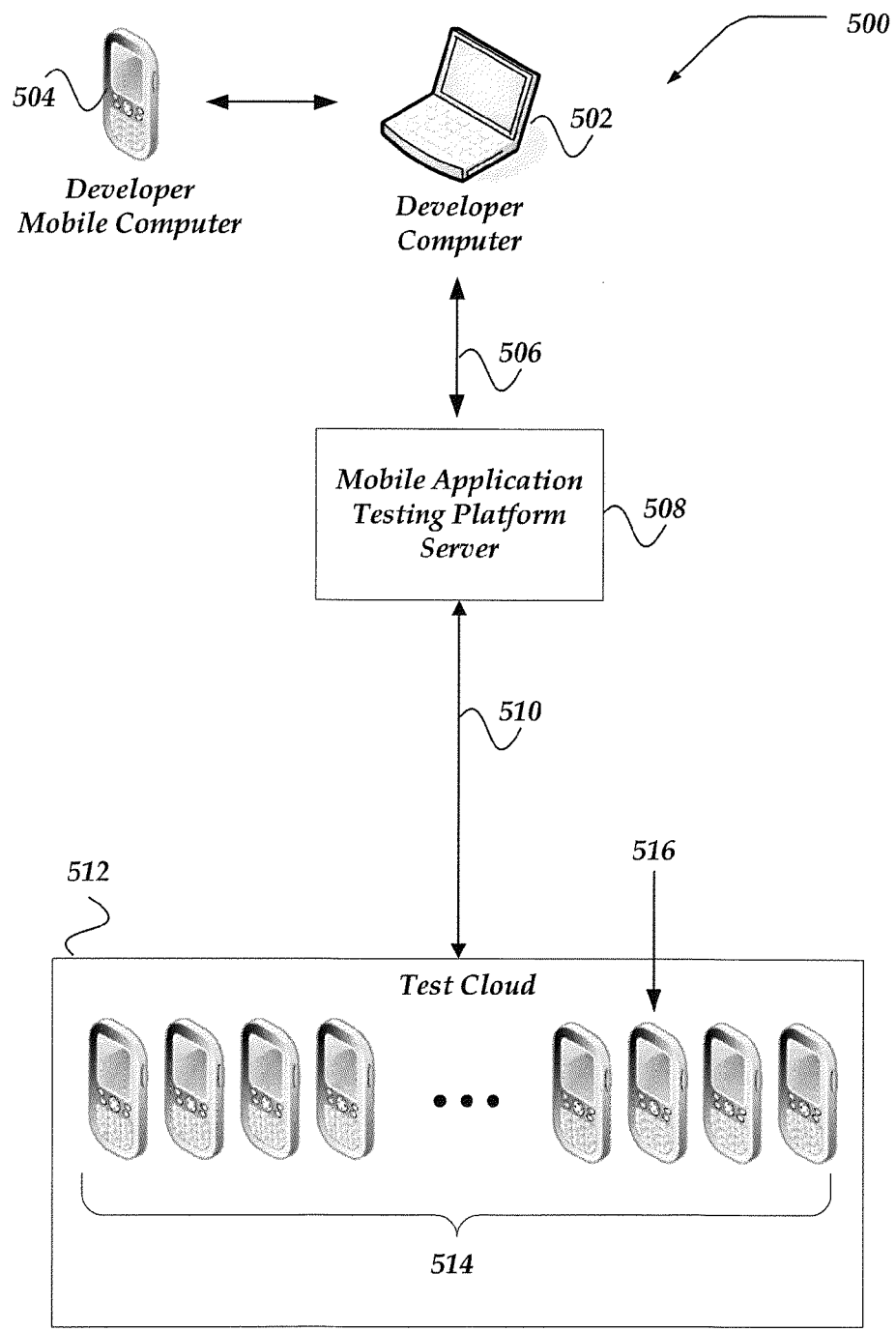
FIG. 5 illustrates a portion of a logical architecture of for a mobile application testing platform in accordance with at least one of the various embodiments.

FIG. 5 illustrates a portion of logical architecture of a mobile application testing platform 500 in accordance with at least one of the various embodiments. In at least one of the various embodiments, one or more mobile application developers may be developing mobile applications using various computers, such as developer computer 502. In at least one of the various embodiments, mobile application developers may be using one or more local mobile computers, such as, developer mobile computer 504 for limited/local application testing.

In at least one of the various embodiments, application developers may upload applications and/or test scripts over network 506 to mobile application testing platform server 508. In at least one of the various embodiments, based on the provided application, content of one or more test scripts, or other criteria, mobile application testing platform server 508 may deploy the uploaded application over network 510 to target test cloud 512. In at least one of the various embodiments, target test cloud 512 may comprise one or more mobile computers, such as, mobile computers 514 that may be used to test the uploaded applications. In at least one of the various embodiments, depending on the operating system, or other requirements, mobile applications may be arranged and/or configured to integrate with client test application 322 that may be installed on mobile computers 514.

In at least one of the various embodiments, mobile computers 514 may include various mobile computers from various manufacturers, makes, models, or the like. They may also include mobile computers with different versions of the operating systems that may be used with any particular mobile computer. In some cases, mobile computers 514 may include devices or computers such as mobile telephones, mobile tablets, digital music players, smart watches, or the like. In at least one of the various embodiments, test cloud 512 may be arranged to include numerous mobile computers to provide a reasonable coverage of mobile computers that may be targeted by the mobile application. For example, mobile computers 514 may include mobile computers from various manufacturers, different mobile device models from each manufacturer, mobile devices running different versions of the same operating system, or the like.

In at least one of the various embodiments, mobile computers 514 may include devices that have been loaded with particular client applications enabling interactions to be tested. For example, in some cases, one or more mobile computers in mobile computers 514 may be the same except they may be loaded with different applications, such as, different e-mail clients, map applications, social networking applications, or the like.

In at least one of the various embodiments, each mobile computer in test cloud 512 may be pre-loaded with client testing application 322, or the like. This may enable each mobile computer to be controlled by a testing controller application, such as, testing control application 282, or testing control application 422, or the like. In at least one of the various embodiments, client testing applications, such as, client testing application 322, or the like, may be arranged to use one or more well-known methods for remote controlling applications that may be operative on a mobile computer. Further, client testing applications may be arranged to communicate over a network with testing control applications, such as, testing control application 282, or testing control application 422.

In at least one of the various embodiments, each mobile computer in mobile computers 514 may be individually addressable by a test control application, such as, testing control application 422. In at least one of the various embodiments, each mobile computer may be identified using one or more built in mobile computer identifiers, such as, International Mobile Equipment Identity (IMEI), Mobile Equipment Identifier (MEID), Electronic Serial Number (ESN), International Mobile Subscriber Identity (IMSI), Unique Device Identifier (UDID), Android_ID, WLAN MAC address, other serial numbers, or the like. Also, in at least one of the various embodiments, the client testing application that may be installed on each mobile computer in mobile computers 514 may include a separate identifier that may be used to identify the mobile computer based on a value known by the client testing application.

In at least one of the various embodiments, each mobile computer in mobile computers 514 may be in communication with mobile application testing platform server 508 over one or more wired and/or wireless networks. Also, in at least one of the various embodiments, computers in mobile computers 514 may communicate with mobile application testing platform server 508 using Universal Serial Bus (USB) connections, or the like. Further, in at least one of the various embodiments, one or more of mobile computers 514 may be directly connected to one or more network computers that may proxy for communication between some or all of mobile computers 514 and mobile application testing platform server 508. For example, in at least one of the various embodiments, one or more mobile computers may be connected to a proxy network computer that forwards communication from the mobile computers to mobile application testing platform server 508. Likewise, the proxy network computer may forward communication from mobile application testing platform server 508 to one or more of mobile computers 514.

In at least one of the various embodiments, testing control applications that may be operative on mobile application testing platform 508 may employ one or more test scripts that enable it to send commands to mobile computers 514 that may be performed by the client testing application that is installed on each mobile computer. In at least one of the various embodiments, the mobile application testing platform may be arranged to communicate test scripts or portions of test scripts to the client testing application operative on each mobile computer. Subsequently the client testing application executes the communicated test script on each mobile computer. Alternatively, in at least one of the various embodiments, a testing control application may be arranged to interpret one or more scripts and send individual commands over a network, such as, network 510, to the client testing application for each relevant mobile computer.

In at least one of the various embodiments, some mobile applications may be arranged to include a library and/or module that facilities remote control and interrogation by a client testing application. Such a library or module may be compiled and/or linked into the mobile application designated for testing by the mobile application developer. In other cases, there may be built in features of the mobile operating system that enable the client testing application to remote control other applications, and/or to monitor mobile applications that may be operative on the mobile computer. Further, in at least one of the various embodiments, mobile application may be arranged for testing by compiling them in "debug mode" which may enable a client testing application to have increased remote control and/or monitoring capability.

In at least one of the various embodiments, test scripts may be written in various computer software languages, such as, Ruby, C# (C-sharp), Objective-C, Java, JavaScript, C, C++, or the like. Generally, the client testing application and/or the mobile application testing platform may be arranged to receive test scripts written in any known and/or custom computer software language. In at least one of the various embodiments, the mobile application testing platform may include a testing control application that may be arranged to compile test scripts written in one or more source software languages into an intermediate/lower level code that may be interpreted by the client testing application that may be installed on each of mobile computers 514.

In at least one of the various embodiments, test scripts may be arranged to include one or more test steps within a test scripts. In at least one of the various embodiments, a test step may be arranged to perform one or more actions on the mobile computers that may be under test. In at least one of the various embodiments, one or more test steps may be grouped and/or organized into a test.

Further, in at least one of the various embodiments, test scripts may include additional information used for configuring the test(s), such as, scheduling information (e.g., when to run the test, how often to run the test, or the like), reporting configuration (e.g., notification rules, report formatting, or the like), mobile computer criteria, or the like.

In at least one of the various embodiments, the mobile application test platform may be arranged to generate a model of a mobile application using automated discovery based on machine learning. In at least one of the various embodiments, the mobile application may be uploaded from developer computer 502 to mobile application testing platform server 508 absent a test script. The uploaded application may be analyzed by a testing control application, such as, testing control application 422 to determine a reference mobile computer.

In at least one of the various embodiments, if a reference mobile computer is determined, such as, reference mobile computer 516, the uploaded application may be deployed to the reference mobile computer. If the uploaded application is deployed to the reference mobile computer, testing control application 422 and/or modeler application 424 may initiate the process of generating an application model for testing. If the application model is generated, a test script may be created based on the application model and deployed to one or more other eligible mobile computers.

Figure 6:
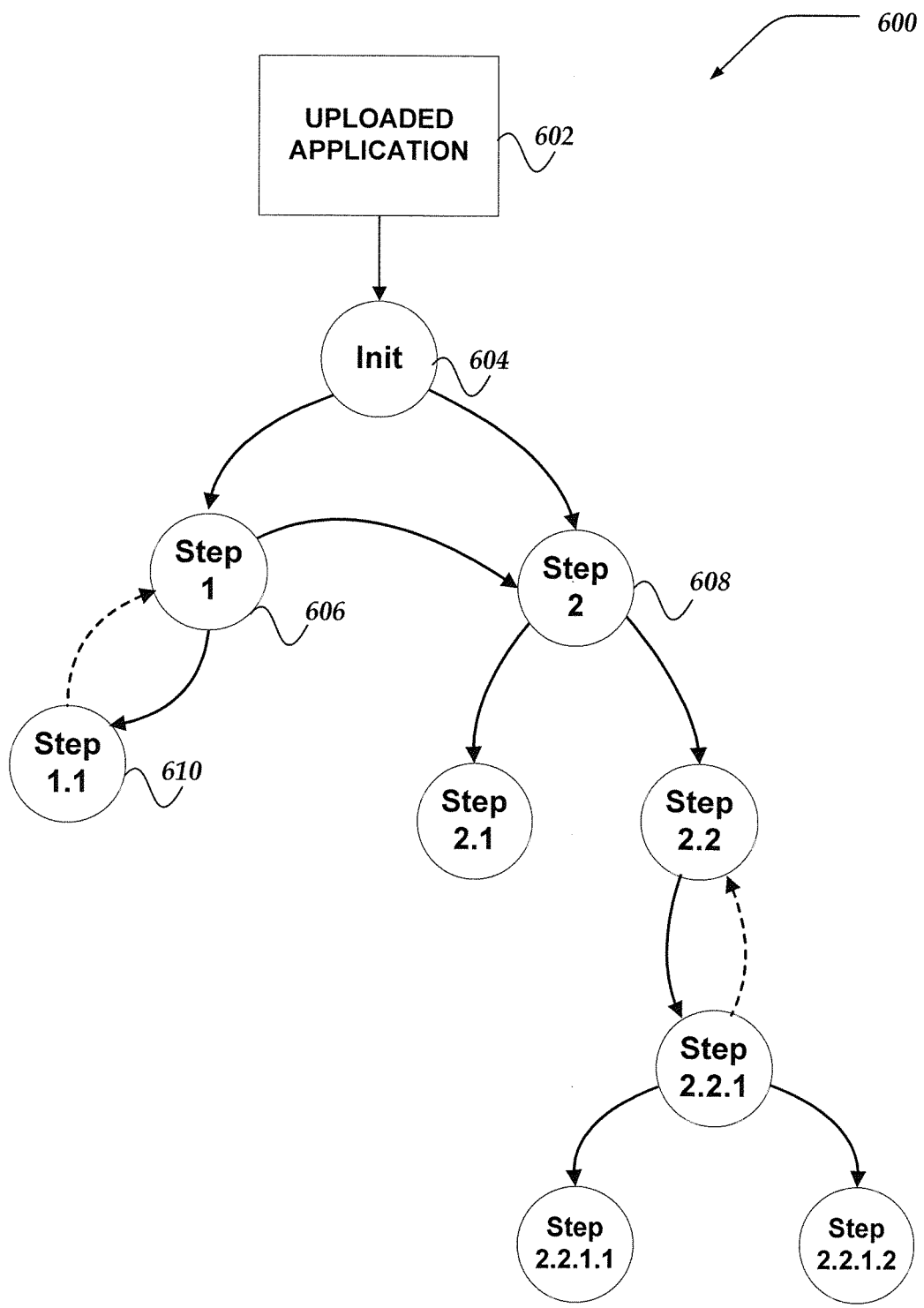
FIG. 6 illustrates a portion of an application model in accordance with at least one of the various embodiments.

FIG. 6 illustrates a portion of application model 600 in accordance with at least one of the various embodiments. In at least one of the various embodiments, if the application being tested is deployed to a reference mobile computer, a modeler application, such as, modeler application 284 or modeler application 424 may explorer the uploaded application to produced an application model based on discoveries made during the exploration of the uploaded application.

In at least one of the various embodiments, it may be convenient to represent application models using a graph data structure. In some embodiments, each vertex in the model may represent a location and/or state within the application being tested. And, the edges may indicate the execution path and/or navigation path that may be followed between the states. For convenience and clarity, application model 600 is provided as a non-limiting example of an embodiment of an application. Uploaded application 602 is first deployed to one or more reference mobile computers. Next, in at least one of the various embodiments, a modeler application may start sending commands to the client testing application to explorer the application that is on the reference computer. In at least one of the various embodiments, commands from the modeler application may includes commands for discovering UI objects, such as, windows, views, buttons, text fields, hyper-links, select/pick lists, or the like.

In at least one of the various embodiments, the exploration conducted by the modeler application may enable discoveries that may be used to generate a model of the application being testing. In this example, vertex 604 (Init) may be the starting point where exploration of the application was initiated. In at least one of the various embodiments, each application model may include an initiation state such as vertex 604 (Init). For this example, vertex 606 (Step 1) may represent the first point in the application that was reached by the modeler application. Likewise, for this example, vertex 608 (Step 2) represents the second point in the application that was reached from vertex 604. And, vertex 610 (Step 1.1) may represent the first step the modeler application reaches from vertex 608 (Step 1).

In at least one of the various embodiments, each vertex in a model may represent a window, screen, or view provided by the application. Moving from one vertex to another may be triggered by the modeler application activating a UI control that is part of the corresponding application windows. Or, in some cases, the application may automatically navigate to another vertex for a view or window based on the state of the application rather than the activation of a UI control. For example, the vertex 604 (Init) may represent a portion of the application that initializes the system and checks if the user is logged into the application. In this example, suppose if the user is not logged the application the application may navigate to a login screen that enables the user to enter name and password. In this example, vertex 606 (Step 1) may be such a login screen. Next, the modeler may supply a user name and password that results in the application navigating to vertex 610 (Step 1.1), perhaps to display a "logging in" wait screen. Next, in this example, the model may show, that after vertex 610 (Step 1.1) the application flows back to the login screen at vertex 606 (Step 1) and then to vertex 608 (Step 2) to access the rest of the application. Alternatively, in this example, if the user for the application being is currently logged in, the application may navigate directly to vertex 608 (Step 2) rather than navigating through the login screens (vertex 606 for this example). Furthermore, one of ordinary skill the art will appreciate that even though this example (e.g., model 600) appears to be discovering the mobile application using a depth first search/traverse of the graph representing the mobile application, the innovations disclosed herein are not so limited. Other search patterns and traversal strategies may be employed, including breadth first search, or the like. Further, the traversal strategy change during discovery of a mobile application. For example, there may be a condition defined that may trigger the traversal strategy to change from depth first to breadth first, and so on. Also, in at least one of the various embodiments, machine learning methods may be configured to select a particular traversal strategy depending on the conditions that may be discovered.

In at least one of the various embodiments, application model 600 may be represented with data structures other than a graph. Also, in at least one of the various embodiments, the underlying data structure used for representing and/or storing the application model information may be different than how the application model may be represented to a user. For example, in at least one of the various embodiments, an application model may be flattened and stored in a database but rendered and displayed to the user using a graph view that shows explicit vertices and edges.

In at least one of the various embodiments, the reference mobile computer used for generating the application model may be an actual physical instance of the selected mobile computer rather than being ran on or in an emulator and/or simulator. The reference mobile computers used for generating the application model may be an instance of the same mobile computers that various mobile carriers and/or manufacturers may make available to consumers. Thus, in at least one of the various embodiments, the application model may be generated by performing actions using the same hardware and software that may be available to consumers.

Generalized Operation

Figure 7:
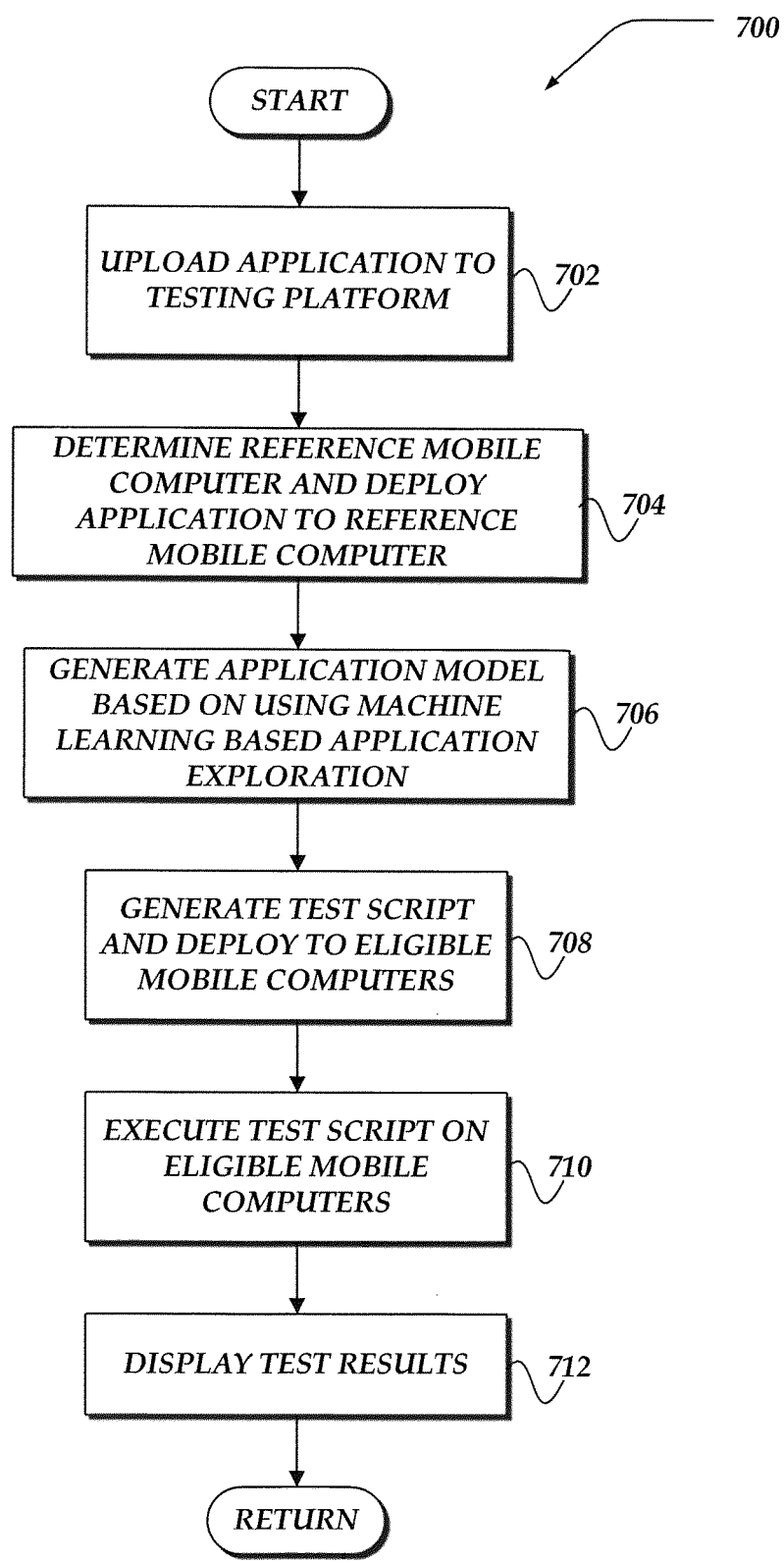
FIG. 7 shows an overview flowchart for a process for generating application models in accordance with at least one of the various embodiments.
Figure 8:
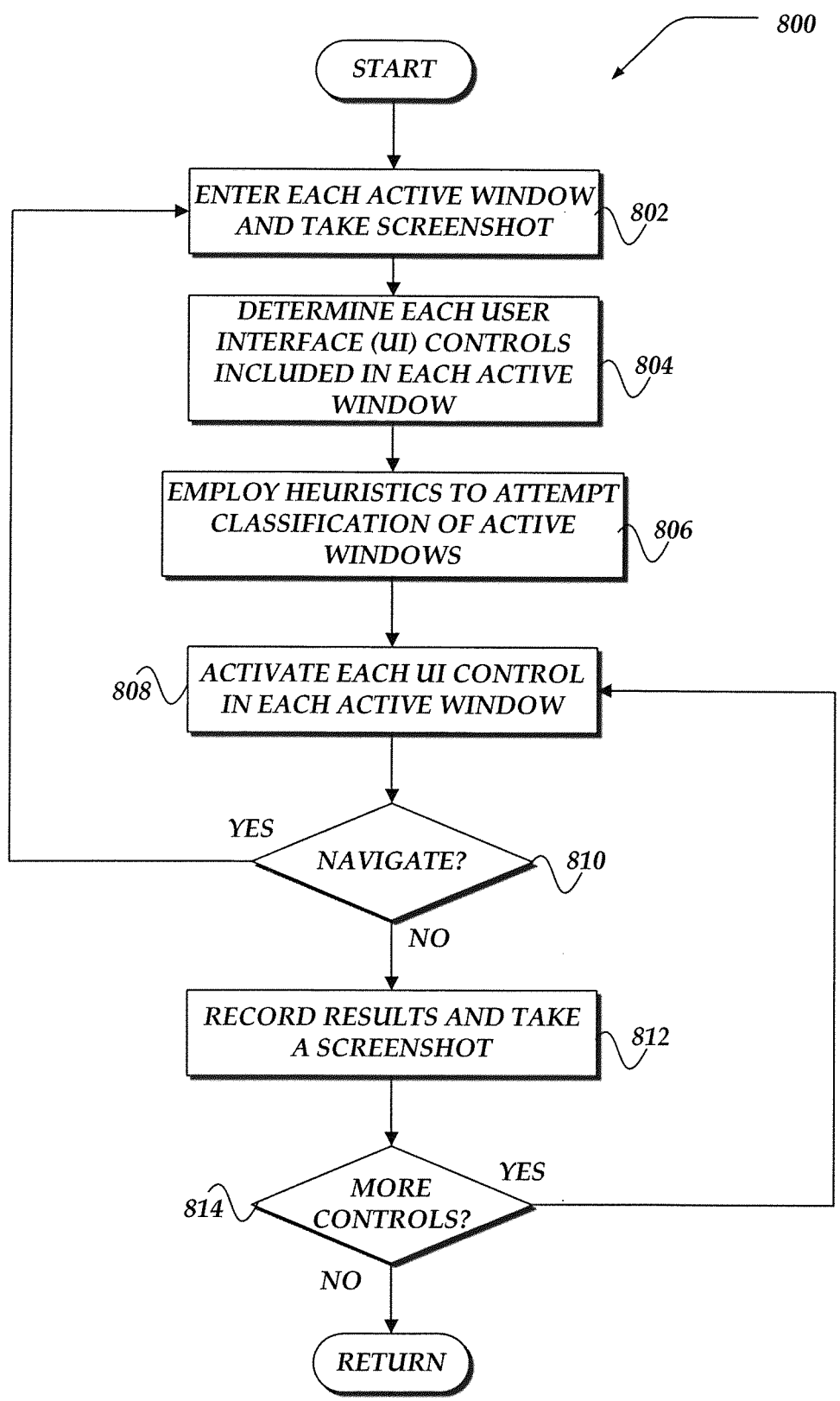
FIG. 8 shows a flowchart for a process for exploring an application to generate an application model in accordance with at least one of the various embodiments.
Figure 9:
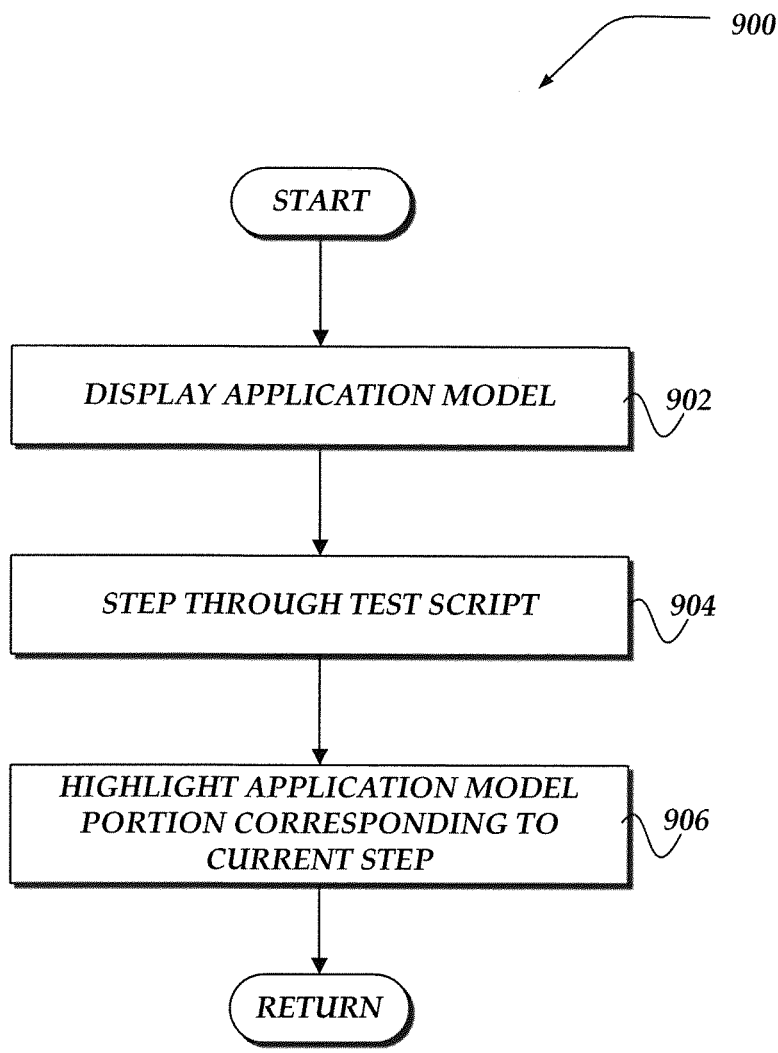
FIG. 9 shows a flowchart for a process for an interactive application model in accordance with at least one of the various embodiments.

FIGS. 7-9 represent the generalized operations of mobile application development in a cloud-based architecture in accordance with at least one of the various embodiments. In at least one of the various embodiments, processes 600, 700, 800, and 900 described in conjunction with FIGS. 7-9 may be implemented by and/or executed on a single network computer, such as network computer 400 of FIG. 4. In other embodiments, these processes or portions of process thereof may be implemented by and/or executed on a plurality of network computers, such as network computer 400 of FIG. 4. In yet other embodiments, these processes or portions thereof may be implemented by and/or executed on one or more blade server computers, such as blade server computer 250 of FIG. 2B. However, embodiments are not so limited and various combinations of network computers, blade server computers, or the like may be utilized. Further, in at least one of the various embodiments, the processes described in conjunction with FIGS. 7-9 may be operative in mobile application testing platform architectures such as those described in conjunction with FIG. 5 and FIG. 6.

FIG. 7 shows an overview flowchart for process 700 for generating application models in accordance with at least one of the various embodiments. After a start block, at block 702, in at least one of the various embodiments, a mobile application may be uploaded to the testing platform in preparation for generating an application model. In at least one of the various embodiments, a mobile application developer may select one or more mobile application for generating application models. In at least one of the various embodiments, the mobile application may be uploaded to mobile application testing platform over a network. In some embodiments, the mobile application may be transferred to the mobile application testing platform using various storage media, such as, USB thumb-drives, CD-ROMS, or the like.

In at least one of the various embodiments, the mobile application may be uploaded to the mobile application testing platform automatically as part of a regularly scheduled process, such as, every 24 hours, or the like. Also, in at least one of the various embodiments, the uploaded process may be configured to upload the mobile application based on one or more conditions, such as, if the an automatic build/compile process successfully completes a build of the mobile application.

At block 704, in at least one of the various embodiments, a reference mobile computer may be determined and the uploaded application may be deployed to the reference mobile computer. In at least one of the various embodiments, the reference mobile computer may be determined based on at least one characteristic of the mobile application.

In at least one of the various embodiments, a process, such as, testing control application 422, may be arranged and/or configured to examine the body of the uploaded mobile application to determine which mobile computers it may be compatible with. In at least one of the various embodiments, packaging data provided with the mobile application may include meta-data that may be used to determine which mobile computers may be compatible with one or more of the characteristics of the mobile application.

In at least one of the various embodiments, if a user uploads the mobile application to the mobile application testing platform, the may be may be enabled to provide information and/or characteristics about the mobile application as it is uploaded. For example, the user may be prompted to identify which mobile operating systems (including which version) maybe compatible with the mobile application.

Also, in at least one of the various embodiments, additional criteria and/or characteristics may be provided by a user to influence the selection of a reference mobile computer, such as, market share of the mobile computer in at least one region (e.g., city, state, country), manufacturer, wireless carrier, physical features (e.g., video, GPS, front camera, or the like), processor speed, processor type, web browser type, memory capacity, storage media capacity, or the like. In some cases, a user may select a particular mobile computer to be the reference mobile computer.

In at least one of the various embodiments, a reference mobile computer may be determined based on the particular version and/or maker of various installed mobile applications, such as, web browsers, messaging applications, mapping/navigation application, contact managers, camera/photo/video applications, email clients, social networking clients, or the like.

In at least one of the various embodiments, since mobile carriers and/or network providers may offer customized/modified versions of mobile computers to their respective consumers, the mobile carrier may be added he criteria information as well.

In at least one of the various embodiments, the criteria information may be provided as the mobile application is uploaded onto the mobile application testing platform, or it may be stored in a configuration store, such as, a configuration file, or database, and retrieved if needed.

In at least one of the various embodiments, based on the various provided and/or available criteria and/or configurations, a reference mobile computer may be determined. And, in at least one of the various embodiments, the uploaded mobile application may be deployed from the mobile application testing platform device to a physical instance of the reference mobile computer.

At block 706, in at least one of the various embodiments, an application model for the uploaded application may be generated based on using machine learning based application exploration. In at least one of the various embodiments, a modeler application, such as, modeler application 424, may provide commands and/or instructions to a client testing application that is installed on the reference mobile computer. In at least one of the various embodiments, the testing client application may perform actions on the reference mobile computer in response to the commands provided by the modeler application. Also, in at least one of the various embodiments, the modeler application may receive information from the client testing application reporting information back to the modeler application that maybe used as part of the model generation process. See, FIG. 8, and its accompanying description for additional detail.

At block 708, in at least one of the various embodiments, one or more test scripts may be generated based on the application model. And, the generated test scripts may be deployed and/or installed on or more eligible mobile computers. In at least one of the various embodiments, the application model may be employed to generate one or more test scripts that may be used for testing the modeled mobile application's performance/behavior on one or more mobile computers.

In at least one of the various embodiments, the test scripts may be automatically generated as the application model is generated. Or, in at least one of the various embodiments, the test scripts may be automatically generated after the modeler application has finished generating the application model. In at least one of the various embodiments, the test script may be based on the application model such at least one portion of the test script corresponds to each active window visited on the reference mobile computer. Also, in at least one of the various embodiments, the test script may include one or more portions that correspond to each UI control that may be activated on the reference mobile computer. In at least one of the various embodiments, the test script, may include one or more portions that correspond to each active window for the mobile application.

At block 710, in at least one of the various embodiments, the one or more test scripts may be executed on the eligible mobile computers. In at least one of the various embodiments, mobile application may identify a set of eligible mobile computers, in addition to the reference mobile computer, that may be tested using the test script that was generated from the application model. The mobile application testing platform may deploy the test script to each of the eligible mobile computers and execute the test script on each of eligible mobile computer. In at least one of the various embodiments, the eligible mobile computers may be determined using, but not limited to criteria such as described in block 704 (determining a reference mobile computer)

In at least one of the various embodiments, the process of deploying and executing the test script on the eligible mobile computers may be delayed to some other time based on configuration settings, or user input. For example, the user may want to examine the application model and/or the test script before performing the testing on devices other than the reference mobile computer.

In at least one of the various embodiments, the test script may be executed on actual physical instances of the eligible mobile computers rather than being ran on or in emulators and/or simulators. The mobile computers used for testing may be instances of the same mobile computers that various mobile carriers and/or manufacturers may make available to consumers. Thus, in at least one of the various embodiments, the test script may be executed using the same hardware and software that are available to consumers At block 712, in at least one of the various embodiments, the results of the testing and application model generation may be displayed to the user. In at least one of the various embodiments, the application model may be displayed to the user using a text based and/or graphical based report. Also, in at least one of the various embodiments, a report that includes the results of running the test script may be generated and/or displayed to the user.

In at least one of the various embodiments, the application model may be displayed separately from running the test script on other mobile computers. So, in at least one of the various embodiments, the application model report may be generated and provided to a user before additional tests are run on other mobile computers. Next, in at least one of the various embodiments, control may be returned to a calling process.

FIG. 8 shows a flowchart for process 800 for exploring an application to generate an application model in accordance with at least one of the various embodiments. After a start block, at block 802, in at least one of the various embodiments, one or more active windows of the application may be determined and a screenshot may be taken.

In at least one of the various embodiments, the client testing application may be arranged to use built-in features of the mobile operating system to determine the one or more active windows of the application. For example, some mobile computer operating systems provide API's that enable applications to examine the windows and/or objects that comprise applications running on the same mobile computer. Other mobile computer operating systems may have more limitations, if so the mobile application running on the reference mobile computer may be linked with an interface library that enables the client testing application to access active window information. Or, in at least one of the various embodiments, the client testing application may be temporarily compiled into the mobile application for use during the testing period. Nevertheless, one or more well-known techniques may be used to enable the client testing application to determine of some or all of the active windows in the application.

In at least one of the various embodiments, a modeler application, such as modeler application 424, may be arranged to provide commands to a client testing application, such as, client testing application 322. In at least one of the various embodiments, at least one of these commands may direct the client testing application to take at least one screenshot that captures the current screen and/or the active windows on the reference mobile computer's display screen. In at least one of the various embodiments, the screenshot may be tagged and/or otherwise associated with the current state and/or step in the application model that is being generated. In at least one of the various embodiments, information may be added to the model to indicate that the screenshot corresponds with a particular window in the application.

In at least one of the various embodiments, the screenshot may be stored on the local memory of the reference mobile computer for later delivery to the modeler application. Or, in at least one of the various embodiments, the screenshot may be provided directly to the modeler application. In either case, the screenshot(s) may be provided to the modeler application over a network and stored on mobile application testing platform.

In at least one of the various embodiments, the client testing application may be arranged to control the mobile application by using one or more built-in facilities of the mobile operating system that enable a screenshot to be captured.

In some cases, after the mobile application is initialized, the mobile application user-interface may be on a starting window. A screenshot may be taken of the starting window and tagged as such.

At block 804, in at least one of the various embodiments, the UI controls in the one or more active windows may be determined. In at least one of the various embodiments, the client testing application may be arranged to iterate over various user-interface controls and objects that may be present in a window. Thus, each user-interface control in the current window may be discovered and classified as to its class, type, name, location, or the like. For example, a login window of a mobile application may include several UI controls, such as, labels, text controls, password controls, buttons, or the like.

In at least one of the various embodiments, the client testing application may be arranged to use built-in features of the mobile operating system to iterate through the different UI controls. For example, some mobile computer operating systems provide API's that enable applications to examine the controls and/or objects that comprise applications running on the same mobile computer. Other mobile computer operating systems may have more limitations, if so the mobile application running on the reference mobile computer may be linked with an interface library that enables the client testing application to access UI control information. Or, in at least one of the various embodiments, the client testing application may be temporarily compiled into the mobile application for use during the testing period. Nevertheless, one or more well-known techniques may be used to enable the client testing application to iterate and/or determine of some or all of the UI controls that may be in the one or more active windows.

In at least one of the various embodiments, the modeler application may be arranged to employ various machine learning techniques, such as, neural networks, Bayesian methods, heuristics, expert systems, or the like, or combination thereof, to discover the UI controls and to determine the order of activating them. For example, in at least one of the various embodiments, Bayesian methods may be employed to determine which UI control to activate based on what has occurred in previous UI controls and/or UI windows. Also, expert systems, or the like, may be arranged to navigate and discover UI controls and features for certain classes of mobile applications. Accordingly, the modeler application may employ an expert system that may be arranged to perform particular discovery actions depending on the application type. For example, an expert system may be arranged to discover map/navigation mobile applications by executing actions that would be expected and/or common to performed on a map/navigation application, such as, entering an address, searching for nearest attractions, getting directions from one point to another, or the like. Further, in at least one of the various embodiments, heuristics may be employed to recognize one or more particular UI control arrangements that may have one or more corresponding discovery patterns. In at least one of the various embodiments, machine learning information, including heuristics information, discovery history, expert system information, or the like, may be stored in computer storage accessible by the modeler application, such as, memory 256, data storage 410, processor readable stationary storage 434, processor readable removable storage 436, or the like.

Moreover, one of ordinary skill in the art will appreciate that other techniques, including other machine learning techniques may be employed to discover UI controls without departing from the scope of these innovations. The discovery methods described herein should be considered to the non-limiting examples of UI control discovery methods that may be employed in at least one of the various embodiments.

At block 806, in at least one of the various embodiments, one or more heuristics may be employed to attempt to classify the current active window. In at least one of the various embodiments, the modeler application may be arranged to use one or more heuristics to identify certain common UI control profiles that may indicate the purpose of the screen or portion of the screen. For example, a screen that includes a text field, a password field, and a button, may be identified to match a profile for a "login screen" used for receiving a username and password to authenticate a user. In at least one of the various embodiments, the classification of the active window may be used in part for determining how the UI controls in the active window may be activated.

In at least one of the various embodiments, common UI profiles may include, mailing address, telephone number, credit card entry (e.g., card type, credit card number, card-holder name, expiration date, or the like), date/time entry, appointment setting, email address, login page, or the like. Also, in at least one of the various embodiments, the modeler application may include configurable set of profile tests that may be added to as additional common associations may be discovered.

At block 808, in at least one of the various embodiments, each UI control for the one or more active windows may be activated. In at least one of the various embodiments, the modeler application may automatically activate each control in each active window. In at least one of the various embodiments, the modeler application may be arranged to have pointers or other references to the discovered UI controls for the active window stored in a data structure (e.g., stack, hash, list, array, or the like) that enables the UI controls to be activated in turn. If a UI control is activated it may be marked, tagged, or otherwise removed from the set of un-activated UI controls for the current active window.

In at least one of the various embodiments, the specific action provided to activate the UI control may vary depending on the type and/or class of the UI control. In at least one of the various embodiments, if a UI control is a button, it may be activated by sending it a simulated 'click' event to activate it. Likewise, if a control is a text edit field, it may be activated by simulating text entry into the field.

Various mobile operating systems may provide various ways specific to each operating system for "remote controlling" the mobile application by sending simulated activation to the UI control in an application. One of ordinary skill in the art will appreciate that be arranged to work with different remote control implementations is within the scope of the present innovations. Mobile operating systems and application developer kits often in debugging and instrumentation facilities that may be employed by the modeler application and/or client testing application to active the UI controls. Furthermore, if a particular mobile operating system does not provide native facilities for remote controlling applications, custom libraries may be implemented to provide such services.

In at least one of the various embodiments, if a UI profile is indicated the modeler application may perform actions consistent with the profile. For example, if login screen is indicated, the modeler application may be arranged to try multiple activations such as logging in with the correct credentials, trying to login with incorrect credentials, trying to bypass the login screen, and so on. Likewise, for example, if a telephone number UI profile is indicated, the modeler application may try phone number combinations of different lengths, with dashes, without dashes, or the like. In at least one of the various embodiments, the additional activation steps for UI profiles may be included as part of the UI profile definition or they may be stored in a configuration file or database that is associated with the UI profile.

At decision block 810, in at least one of the various embodiments, if the action of the control causes the application to navigate to a different window, control may loop back to block 802; otherwise, in at least one of the various embodiments, control may flow to block 812.

In at least one of the various embodiments, in some cases activating a UI control may cause the mobile application to navigate to another window. In at least one of the various embodiments, this window may become the active window. For example, in at least one of the various embodiments, activating the login button of login screen may cause the mobile application navigate to a welcome screen.

In at least one of the various embodiments, if there is a delay that exceeds a configurable threshold, the client testing application may take a screenshot and tag it appropriately. Also, in at least one of the various embodiments, the client testing application may detect that the screen contents have changed before the navigation occurs. If so the client testing application may take a screenshot and tag it appropriately.

In at least one of the various embodiments, the modeler application may be arranged to employ recursion as it discovers the mobile application. Thus, in at least one of the various embodiments, the active window may be pushed onto a stack or other data structure as the activation of UI control causes navigation to another active window and returned to in the course of exploring the mobile application.

Furthermore, in at least one of the various embodiments, the data structure used to track and generate the application model may be updated to include the result that activating a UI control. In at least one of the various embodiments, if the activation causes the application to navigate to another active window the model may be updated to include the navigation step—which may correspond to another vertex if a graph is used as part of the application model. In at least one of the various embodiments, as each UI control may be activated information may be added to the application model that corresponds to activation of each UI control. In at least one of the various embodiments, this information may include information about the UI control, such as, control type, control ID, control style, a list of parameters that were passed to the control, control location within the active window, or the like.

At block 812, the resulting effects of activating the current UI control may be recorded and/or a screenshot may be generated. In at least one of the various embodiments, if the activation of the UI control does not cause the mobile application to navigate to another window, a screenshot may be taken and appropriately tagged and stored.

In at least one of the various embodiments, the client testing application may also record any other observable results, such as, text changes in text fields and labels, lists entry changes, UI controls added, moved, or removed, or the like.

At decision block 814, in at least one of the various embodiments, if there are UI controls to activate, control may loop back to block 808; otherwise, in at least one of the various embodiments, control may be returned to a calling process. In at least one of the various embodiments, if all the UI controls have been activated for the current window, process 800 may return to a calling process. However, in at least one of the various embodiments, the modeler application may be arranged to employ a recursive process to explore the mobile application, Thus, in at least one of the various embodiments, the return block may return control to the process such that a previous visited window becomes the current window and the remained of it UI controls, if any, may be activated.

FIG. 9 shows a flowchart for process 900 for an interactive application model in accordance with at least one of the various embodiments. After a start block, at block 902, in at least one of the various embodiments, the application model for an application may be displayed to a user. In at least one of the various embodiments, generated application models may be displayed in user-interface. In some embodiments, the application model may be in the form of a graph and may appear somewhat like FIG. 6. In at least one of the various embodiments, the display may be arranged to enable a user to visualize the structure of the mobile application that corresponds to the application model.

At block 904, in at least one of the various embodiments, the portions of the test script that correspond to the displayed application model may be stepped through. In at least one of the various embodiments, one or more UI elements may be displayed to enable the user to step through the each portion of the test script. In at least one of the various embodiments, this may be a list of the test script portions (test steps) having labels and descriptions. Or, in at least one of the various embodiments, the stepping function may be enabled using a UI control such as a "slider control." The front one end of the slider may correspond to the beginning of the test script (the first test step) and the other end of the slider control may correspond to the end of the test script. The intervening test steps may be accessed by sliding the slider control such that the position of the thumb of the slider corresponds to a test step. In at least one of the various embodiments, other UI elements may be arranged to enable a user to step through in sequence, or otherwise, the test steps and/or test script portions, that comprise the test script. One of ordinary skill in the art will appreciate that there are many other UI elements that may be employed for stepping through the test script without out departing from the scope of the innovations herein.

At block 906, in at least one of the various embodiments, one or more portions of the application model may be highlighted as the portion of the test script may be executed. In at least one of the various embodiments, a portion of the application model maybe highlighted as a corresponding portion of the test script is stepped through its execution. Likewise, in at least one of the various embodiments, an interactive display of the highlighted portion of the application model and the test script for a user may be generated and otherwise made available to the user.

In at least one of the various embodiments, if the application model may be displayed using a graph view with edges and vertices as in FIG. 6, the edges and vertices the correspond to the portion of the test script that is being stepped into may be highlight using or more graphical techniques, such as, changing the color, adjusting the brightness, zooming in, rendering a border, or the like.

In at least one of the various embodiments, as an application model portion is highlighted, additional information may be displayed in conjunction to the highlighting of the model portion. For example, directional indicators may be displayed indicating the direction in the model that the "application flow" is traveling. Also, in at least one of the various embodiments, the values used for entering into text fields, and so on, may be displayed as well.

Further, in at least one of the various embodiments, application model portions may be rendered to indicate the degree of consistency of each portion of the test script corresponding to the application model portion. For example, in at least one of the various embodiments, if a portion of a test script works without error on all of the eligible mobile computers then the application model portion may be displayed using the color green. Likewise, if the test script portion produces failures and/or inconsistent behavior across a number of eligible mobile computers, the application model portion may be rendered using a different color, such as, red to indicate that there may be problems. In at least one of the various embodiments, badges, icons, shapes, or the like may be used to indicate that there may be problems associated with portions of the test script. In at least one of the various embodiments, the one or more indicators (colors, shapes, icons, etc.) may be mapped to correspond threshold values that if exceeded trigger the indicators to be displayed. Next, in at least one of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for testing mobile applications over a network using a computer that is operative to perform actions, comprising:
   determining a reference mobile computer based on at least one characteristic of a provided mobile application;
   installing the mobile application on a physical instance having the same hardware and software as the reference mobile computer;
   generating an application model based on the mobile application and the physical instance of the reference mobile computer, by employing one or more machine learning techniques to perform further actions on the physical instance of the reference mobile computer, including:
  determining each active window of the mobile application executing on the physical instance of the reference mobile computer;
  generating at least one screenshot on the physical instance of the reference mobile computer that corresponds to each active window, wherein the at least one screenshot is stored by the computer;
  determining each user-interface (UI) control for the mobile application that is included in each active window based on at least iterating over each UI control that is in each active window, wherein each determined UI control is classified as to its type and class in each active window and associated with at least one UI control profile;
  separately activating each UI control in each active window executing on the physical instance of the reference mobile computer based on the at least one UI control profile, wherein at least one action is selected from the at least one UI control profile based on at least one of the determined type or determined class for the activated UI control;
  generating at least one screenshot on the physical instance of the reference mobile computer that corresponds to each result for separately activating each UI control for the mobile application executing on the physical instance of the reference mobile computer;
  adding to the application model information that includes at least one of an active window, a screenshot, or a result for separately activating a UI control for the mobile application executing on the physical instance of the reference mobile computer; and
  automatically generating a test script for executing the mobile application on at least one other mobile computer based on the application model, wherein the at least one other mobile computer is determined to be eligible based on one or more of the at least one characteristic of the provided mobile application and one or more of criteria for the physical instance of the reference mobile computer.

2. The method of claim 1, further comprising, classifying at least one active window based on one or more heuristic tests, wherein the classification is employed to determine activation of at least one UI control in the at least one active window.

3. The method of claim 1, wherein separately activating each UI control, further comprises, determining another active window if activation results in navigation away from a current active window that includes a currently activated UI control.

4. The method of claim 1, wherein separately activating each UI control, further comprises, adding information to the application model that corresponds to activation of each UI control.

5. The method of claim 1, wherein automatically generating the test script, further comprises corresponding each active window to at least one portion of the test script for the mobile application executing on at least the one other mobile computer.

6. The method of claim 1, further comprising, installing the test script on each other mobile computer, wherein the test script is executed when the mobile application executes on each other mobile computer.

7. The method of claim 1, further comprising:
  highlighting a portion of the application model as a corresponding portion of the test script is stepped through its execution; and
  generating an interactive display of the highlighted portion of the application model and the test script for a user.

8. The method of claim 1, further comprising, determining the physical instance of the reference mobile computer based on criteria including one or more of a screen size, a screen resolution, an operating system, an input method, a processor speed, a processor type, a memory capacity, a browser, a manufacturer, a storage media capacity, or a market share for sales in at least one country.

9. A system for testing mobile applications, comprising:
a network computer, including:
  a transceiver for communicating over the network;
  a memory for storing at least instructions;
  a processor device that is operative to execute instructions that enable actions, including:
    determining a reference mobile computer based on at least one characteristic of a provided mobile application;
    installing the mobile application on a physical instance having the same hardware and software as the reference mobile computer;
    generating an application model based on the mobile application and the physical instance of the reference mobile computer, by employing one or more machine learning techniques to perform further actions on the physical instance of the reference mobile computer, including:
      determining each active window of the mobile application executing on the physical instance of the reference mobile computer;
      generating at least one screenshot on the physical instance of the reference mobile computer that corresponds to each active window, wherein the at least one screenshot is stored by the computer;
      determining each user-interface (UI) control for the mobile application that is included in each active window based on at least iterating over each UI control that is in each active window, wherein each determined UI control is classified as to its type and class in each active window and associated with at least one UI control profile;
      separately activating each UI control in each active window executing on the physical instance of the reference mobile computer based on the at least one UI control profile, wherein at least one action is selected from the at least one UI control profile based on at least one of the determined type or determined class for the activated UI control;
      generating at least one screenshot on the physical instance of the reference mobile computer that corresponds to each result for separately activating each UI control for the mobile application executing on the physical instance of the reference mobile computer;
      adding to the application model information that includes at least one of an active window, a screenshot, or a result for separately activating a UI control for the mobile application executing on the physical instance of the reference mobile computer; and
    automatically generating a test script for executing the mobile application on at least one other mobile computer based on the application model, wherein the at least one other mobile computer is determined to be eligible based on one or more of the at least one characteristic of the provided mobile application and one or more of criteria for the physical instance of the reference mobile computer; and a client network computer, including:
- a transceiver for communicating over the network;
- a memory for storing at least instructions;
- a processor device that is operative to execute instructions that enable actions, including:
  - providing the mobile application to the network computer.

10. The system of claim 9, further comprising, classifying at least one active window based on one or more heuristic tests, wherein the classification is employed to determine activation of at least one UI control in the at least one active window.

11. The system of claim 9, wherein separately activating each UI control, further comprises, determining another active window if activation results in navigation away from a current active window that includes a currently activated UI control.

12. The system of claim 9, wherein separately activating each UI control, further comprises, adding information to the application model that corresponds to activation of each UI control.

13. The system of claim 9, wherein automatically generating the test script, further comprises corresponding each active window to at least one portion of the test script for the mobile application executing on at least the one other mobile computer.

14. The system of claim 9, further comprising, installing the test script on each other mobile computer, wherein the test script is executed when the mobile application executes on each other mobile computer.

15. The system of claim 9, further comprising:
- highlighting a portion of the application model as a corresponding portion of the test script is stepped through its execution; and
- generating an interactive display of the highlighted portion of the application model and the test script for a user.

16. The system of claim 9, further comprising, determining the physical instance of the reference mobile computer based on criteria including one or more of a screen size, a screen resolution, an operating system, an input method, a processor speed, a processor type, a memory capacity, a browser, a manufacturer, a storage media capacity, or a market share for sales in at least one country.

17. A network computer for testing mobile applications, comprising:
- a transceiver for communicating over the network;
- a memory for storing at least instructions;
- a processor device that is operative to execute instructions that enable actions, including:
  - determining a reference mobile computer based on at least one characteristic of a provided mobile application;
  - installing the mobile application on a physical instance having the same hardware and software as the reference mobile computer;
  - generating an application model based on the mobile application and the physical instance of the reference mobile computer, by employing one or more machine learning techniques to perform further actions on the physical instance of the reference mobile computer, including:
    - determining each active window of the mobile application executing on the physical instance of the reference mobile computer;
    - generating at least one screenshot on the physical instance of the reference mobile computer that corresponds to each active window, wherein the at least one screenshot is stored by the computer;
    - determining each user-inter ice (UI) control for the mobile application that is included in each active window based on at least iterating over each UI control that is in each active window, wherein each determined UI control is classified as to its type and class in each active window and associated with at least one UI control profile;
    - separately activating each UI control in each active window executing on the physical instance of the reference mobile computer based on the at least one UI control profile, wherein al least one action is selected from the at least one UI control profile based on at least one of the determined type or determined class for the activated UI control;
    - generating at least one screenshot on the reference mobile computer that corresponds to each result for separately activating each UI control for the mobile application executing on the physical instance of the reference mobile computer;
    - adding to the application model information that includes at least one of an active window, a screenshot, or a result for separately activating a UI control for the mobile application executing on the physical instance of the reference mobile computer; and
  - automatically generating a test script for executing the mobile application on at least one other mobile computer based on the application model, wherein the at least one other mobile computer is determined to be eligible based on one or more of the at least one characteristic of the provided mobile application and one or more of criteria for the physical instance of the reference mobile computer.

18. The network computer of claim 17, further comprising, classifying at least one active window based on one or more heuristic tests, wherein the classification is employed to determine activation of at least one UI control in the at least one active window.

19. The network computer of claim 17, wherein separately activating each UI control, further comprises, determining another active window if activation results in navigation away from a current active window that includes a currently activated UI control.

20. The network computer of claim 17, wherein separately activating each UI control, further comprises, adding information to the application model that corresponds to activation of each UI control.

21. The network computer of claim 17, wherein automatically generating the test script, further comprises corresponding each active window to at least one portion of the test script for the mobile application executing on at least the one other mobile computer.

22. The network computer of claim 17, further comprising, installing the test script on each other mobile computer, wherein the test script is executed when the mobile application executes on each other mobile computer.

23. The network computer of claim 17, further comprising, determining the physical instance of the reference mobile computer based on criteria including one or more of a screen size, a screen resolution, an operating system, an input method, a processor speed, a processor type, a memory capacity, a browser, a manufacturer, a storage media capacity, or a market share for sales in at least one country.

24. A processor readable non-transitory storage media that includes instructions for testing mobile applications, wherein a computer that executes at least a portion of the instructions is enabled to perform actions, comprising:
- determining a reference mobile computer based on at least one characteristic of a provided mobile application;
- installing the mobile application on a physical instance having the same hardware and software as the reference mobile computer;
- generating an application model based on the mobile application and the physical instance of the reference mobile computer, by employing one or more machine learning techniques to perform further actions on the physical instance of the reference mobile computer, including:
  - determining each active window of the mobile application executing on the physical instance of the reference mobile computer;
  - generating at least one screenshot on the physical instance of the reference mobile computer that corresponds to each active window, wherein the at least one screenshot is stored by the computer;
  - determining each user-interface (UI) control for the mobile application that is included in each active window based on at least iterating over each UI control that is in each active window, wherein each determined UI control is classified as to its type and class in each active window and associated with at least one UI control profile;
  - separately activating each UI control in each active window executing on the physical instance of the reference mobile computer based on the at least one UI control profile, wherein at least one action is selected from the at least one UI control profile based on at least one of the determined type or determined class for the activated UI control;
  - generating at least one screenshot on the physical instance of the reference mobile computer that corresponds to each result for separately activating each UI control for the mobile application executing on the reference mobile computer;
  - adding to the application model information that includes at least one of an active window, a screenshot, or a result for separately activating a UI control for the mobile application executing on the physical instance of the reference mobile computer; and
- automatically generating a test script for executing the mobile application on at least one other mobile computer based on the application model, wherein the at least one other mobile computer is determined to be eligible based on one or more of the at least one characteristic of the provided mobile application and one or more of criteria for the physical instance of the reference mobile computer.

25. The media of claim 24, further comprising, classifying at least one active window based on one or more heuristic tests, wherein the classification is employed to determine activation of at least one UI control in the at least one active window.

26. The media of claim 24, wherein separately activating each UI control, further comprises, determining another active window if activation results in navigation away from a current active window that includes a currently activated UI control.

27. The media of claim 24, wherein separately activating each UI control, further comprises, adding information to the application model that corresponds to activation of each UI control.

28. The media of claim 24, wherein automatically generating the test script, further comprises corresponding each active window to at least one portion of the test script for the mobile application executing on at least the one other mobile computer.

29. The media of claim 24, further comprising, installing the test script on each other mobile computer, wherein the test script is executed when the mobile application executes on each other mobile computer.

30. The media of claim 24, further comprising:
- highlighting a portion of the application model as a corresponding portion of the test script is stepped through its execution; and
- generating an interactive display of the highlighted portion of the application model and the test script for a user.

* * * * *

UNITED STATES PATENT AND TRADEMARK OFFICE
CERTIFICATE OF CORRECTION

PATENT NO. : 9,053,435 B2  
APPLICATION NO. : 14/029670  
DATED : June 9, 2015  
INVENTOR(S) : Krukow et al.

Page 1 of 1

It is certified that error appears in the above-identified patent and that said Letters Patent is hereby corrected as shown below:

In the specification

In Column 2, Line 52, delete "in art the" and insert -- in the art --, therefor.

In Column 6, Lines 27-28, delete "2rd (2G), 3rd (3G), 4th (4G), (5G)" and insert -- $2^{nd}$ (2G), $3^{rd}$ (3G), $4^{th}$ (4G), $5^{th}$ (5G) --, therefor.

In Column 7, Line 11, delete "Backplane 208" and insert -- Backplane 202 --, therefor.

In Column 17, Line 42, delete "vertex 608" and insert -- vertex 606 --, therefor.

In Column 19, Line 10, delete "the an" and insert -- an --, therefor.

In Column 19, Line 31, delete "the may be may be" and insert -- that may be --, therefor.

In Column 20, Line 55, delete "computer)" and insert -- computer). --, therefor.

In Column 21, Line 4, delete "consumers" and insert -- consumers. --, therefor.

In the claims

In Column 30, Line 5, in Claim 17, delete "user-inter ice" and insert -- user-interface --, therefor.

In Column 30, Line 15, in Claim 17, delete "al least" and insert -- at least --, therefor.

Signed and Sealed this  
Ninth Day of August, 2016

Michelle K. Lee  
*Director of the United States Patent and Trademark Office*